United States Patent
Kato et al.

(10) Patent No.: US 8,993,176 B2
(45) Date of Patent: Mar. 31, 2015

(54) SULFIDE SOLID ELECTROLYTE GLASS, METHOD FOR PRODUCING SULFIDE SOLID ELECTROLYTE GLASS, AND LITHIUM SOLID STATE BATTERY

(75) Inventors: Yuki Kato, Susono (JP); Koji Kawamoto, Miyoshi (JP); Shigenori Hama, Susono (JP); Takamasa Otomo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/811,052

(22) PCT Filed: Jul. 22, 2010

(86) PCT No.: PCT/JP2010/062340
§ 371 (c)(1),
(2), (4) Date: Jan. 22, 2013

(87) PCT Pub. No.: WO2012/011179
PCT Pub. Date: Jan. 26, 2012

(65) Prior Publication Data
US 2013/0164632 A1    Jun. 27, 2013

(51) Int. Cl.
*H01M 6/18* (2006.01)
*H01M 10/0562* (2010.01)
*H01B 1/12* (2006.01)

(52) U.S. Cl.
CPC ........... *H01M 10/0562* (2013.01); *H01B 1/122* (2013.01); *H01M 2300/0068* (2013.01)
USPC ....................................................... 429/322

(58) Field of Classification Search
None
See application file for complete search history.

(56) References Cited

U.S. PATENT DOCUMENTS

| 2012/0034529 A1 | 2/2012 | Tatsumisago et al. |
| 2012/0301796 A1 | 11/2012 | Ohtomo et al. |
| 2013/0164632 A1 | 6/2013 | Kato et al. |

FOREIGN PATENT DOCUMENTS

JP    A-2007-273214    10/2007
(Continued)

OTHER PUBLICATIONS

Machida et al., Preparation of amorphous 75L2S-xP2S3d (25-x)P2S5 (mol%) solid electrolytes by a high-energy ball-milling process and their application for an all-solid-state lithium battery, Solid State Ionics 176 (2005) 473-479.*

Hayashi et al., Formation of superionic crystals from mechanically milled Li2S-P2S5 glasses, Electrochemistry Communications 5 (2003) 111-114).*
(Continued)

*Primary Examiner* — Patrick Ryan
*Assistant Examiner* — Jose Colucci Rios
(74) *Attorney, Agent, or Firm* — Oliff PLC

(57) ABSTRACT

An object of the present invention is to provide a sulfide solid electrolyte glass producing a tiny amount of hydrogen sulfide. The present invention attains the above-mentioned object by providing a sulfide solid electrolyte glass including $Li_3PS_4$, characterized in that $Li_4P_2S_7$ is not detected by $^{31}P$ NMR measurement and the content of $Li_2S$ as determined by XPS measurement is 3% by mol or less.

8 Claims, 5 Drawing Sheets

(56) References Cited

FOREIGN PATENT DOCUMENTS

| | | |
|---|---|---|
| JP | A-2008-103146 | 5/2008 |
| JP | A-2008-103203 | 5/2008 |
| JP | A-2008-103280 | 5/2008 |
| JP | A-2010-33918 | 2/2010 |
| JP | A-2010-199033 | 9/2010 |
| JP | A-2011-129312 | 6/2011 |
| WO | WO 2010/098177 A1 | 9/2010 |
| WO | WO 2012/011179 A1 | 1/2012 |

OTHER PUBLICATIONS

Hayashi et al., High lithium ion conduction of sulfide glass-based solid electrolytes and their application to all-solid-state batteries, Journal of Non-Crystalline Solids 355 (2009) 1919-1923.*

Machida et al., "Mechano-chemical Synthesis of Lithium Ion Conducting Materials in the System $Li_2O$—$Li_2S$—$P_2S_5$," *J. Jpn. Soc. Powder Powder Metallurgy*, Feb. 2004, pp. 91-97, vol. 51, No. 2.

* cited by examiner

SULFIDE SOLID ELECTROLYTE GLASS, METHOD FOR PRODUCING SULFIDE SOLID ELECTROLYTE GLASS, AND LITHIUM SOLID STATE BATTERY

TECHNICAL FIELD

The present invention relates to a sulfide solid electrolyte glass producing a tiny amount of hydrogen sulfide.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery. In addition, a sulfide solid electrolyte glass has been known as a solid electrolyte material used for such a solid electrolyte layer.

The sulfide solid electrolyte glass is so high in Li ion conductivity as to be useful for intending higher output of a battery, and various kinds of research have been conventionally made. For example, in Non Patent Literature 1, a glassy Li ion conductive material such that $Li_2S$ in $75Li_2S \cdot 25P_2S_5$ is partially substituted with $Li_2O$ is disclosed.

CITATION LIST

Patent Literature

Non Patent Literature 1: Nobuya Machida et al., "Mechanochemical Synthesis of Lithium Ion Conducting Materials in the System $Li_2O$—$Li_2S$—$P_2S_5$", J. Jpn. Soc. Powder Powder Metallurgy Vol. 51, No. 2, 91-97

SUMMARY OF INVENTION

Technical Problem

A sulfide solid electrolyte glass has both of an advantage that Li ion conductivity is high, and a disadvantage that the sulfide solid electrolyte glass generates hydrogen sulfide in the case of contacting with water (including moisture, and so forth). On the contrary, the inventors have obtained the knowledge that the adjustment of the composition of the sulfide solid electrolyte glass to ortho-composition allows hydrogen sulfide generation amount to be reduced. Here, ortho generally signifies an oxo-acid which is the highest in degree of hydration among oxo-acids obtained by hydrating the same oxide. In the sulfide solid electrolyte glass obtained by using $Li_2S$, a crystal composition to which $Li_2S$ is added most among sulfides is called ortho-composition. For example, $Li_3PS_4$ corresponds to ortho-composition in the $Li_2S$—$P_2S_5$ system, and the sulfide solid electrolyte glass of ortho-composition is obtained in the case of mixing a raw material at a ratio of $Li_2S$—$P_2S_5$=75:25 on a molar basis. The sulfide solid electrolyte glass having such a composition of $75Li_2S \cdot 25P_2S_5$ is conceived to be the smallest in hydrogen sulfide generation amount for the reason that $Li_2S$ does not remain theoretically; still, it is confirmed that a slight amount of hydrogen sulfide is generated. Thus, the generation of hydrogen sulfide needs to be further reduced for improving stability of the sulfide solid electrolyte glass.

The present invention has been made in view of the above-mentioned actual circumstances, and a main object thereof is to provide a sulfide solid electrolyte glass producing a tiny amount of hydrogen sulfide.

Solution to Problem

In order to solve the above-mentioned problem, through earnest studies, the inventors have obtained the knowledge that $Li_2S$ remains in the sulfide solid electrolyte glass having a composition of $75Li_2S \cdot 25P_2S_5$. Specifically, $Li_2S$ remaining in the sulfide solid electrolyte glass having the above-mentioned composition, which might not be detected by X-ray diffraction (XRD) measurement, was detected by X-ray photoelectron spectroscopy (XPS) measurement. Then, the inventors have reached the present invention by finding out that hydrogen sulfide generation amount may be reduced further than the sulfide solid electrolyte glass having a composition of $75Li_2S \cdot 25P_2S_5$ by making the composition of the sulfide solid electrolyte glass into a composition with far less residue of $Li_2S$ on the basis of the content of $Li_2S$ in the sulfide solid electrolyte glass by XPS measurement.

That is to say, the present invention provides a sulfide solid electrolyte glass comprising $Li_3PS_4$ and characterized in that $Li_4P_2S_7$ is not detected by $^{31}P$ NMR measurement and the content of $Li_2S$ as determined by XPS measurement is 3% by mol or less.

According to the present invention, the sulfide solid electrolyte glass with less residue of $Li_2S$ may be obtained for the reason that the content of $Li_2S$ as determined by XPS measurement is 3% by mol or less. Further, the sulfide solid electrolyte glass with $S_3P$—$S$—$PS_3$ unit ($P_2S_7$ unit) not formed may be obtained for the reason that $Li_4P_2S_7$ is not detected by $^{31}P$ NMR measurement. Thus, the sulfide solid electrolyte glass producing a tiny amount of hydrogen sulfide and high safety may be obtained.

In the above-mentioned invention, the above-mentioned content of $Li_2S$ as determined by XPS measurement is preferably 1% by mol or less. The reason therefor is to allow the sulfide solid electrolyte glass with far less hydrogen sulfide generation amount.

Further, the present invention provides a method for producing a sulfide solid electrolyte glass comprising $Li_3PS_4$, comprising steps of: a preparation step of preparing a raw material composition containing $Li_2S$ and $P_2S_5$, and an amorphizing step of amorphizing the above-mentioned raw material composition by amorphization treatment, characterized in that the above-mentioned raw material composition contains the above-mentioned $Li_2S$ and the above-mentioned $P_2S_5$ at a ratio so as to allow the sulfide solid electrolyte glass such that $Li_4P_2S_7$ is not detected by $^{31}P$ NMR measurement and the content of $Li_2S$ as determined by XPS measurement is 3% by mol or less.

According to the present invention, the sulfide solid electrolyte glass with less residue of $Li_2S$ and $S_3P$—$S$—$PS_3$ unit ($P_2S_7$ unit) not formed may be obtained for the reason that the raw material composition contains $Li_2S$ and $P_2S_5$ at a predetermined ratio. Thus, the sulfide solid electrolyte glass producing a tiny amount of hydrogen sulfide and high safety may be obtained.

In the above-mentioned invention, the above-mentioned content of $Li_2S$ as determined by XPS measurement is preferably 1% by mol or less. The reason therefor is to allow the sulfide solid electrolyte glass with far less hydrogen sulfide generation amount.

Further, the present invention provides a method for producing a sulfide solid electrolyte glass comprising $Li_3PS_4$, and the method comprises steps of: a preparation step of preparing a raw material composition containing $Li_2S$ and $P_2S_5$ at a molar ratio of $xLi_2S \cdot (100-x)P_2S_5$ (x satisfies $73<x<75$), and an amorphizing step of amorphizing the above-mentioned raw material composition by amorphization treatment.

According to the present invention, the sulfide solid electrolyte glass with less residue of $Li_2S$ and $S_3P—S—PS_3$ unit ($P_2S_7$ unit) not formed may be obtained by using the raw material composition containing $Li_2S$ and $P_2S_5$ at a predetermined ratio. Thus, the sulfide solid electrolyte glass producing a tiny amount of hydrogen sulfide and high safety may be obtained.

In the above-mentioned invention, the above-mentioned amorphization treatment is preferably mechanical milling. The reason therefor is that the treatment at normal temperature may be performed to intend the simplification of production processes.

Further, the present invention provides a lithium solid state battery comprising a cathode active material layer containing a cathode active material, an anode active material layer containing an anode active material, and a solid electrolyte layer formed between the above-mentioned cathode active material layer and the above-mentioned anode active material layer, characterized in that at least one of the above-mentioned cathode active material layer, the above-mentioned anode active material layer and the above-mentioned solid electrolyte layer contains the above-mentioned sulfide solid electrolyte glass.

According to the present invention, the use of the above-mentioned sulfide solid electrolyte glass allows the lithium solid state battery producing a tiny amount of hydrogen sulfide and having high safety.

Advantageous Effects of Invention

The present invention produces the effect such as to allow the sulfide solid electrolyte glass producing a tiny amount of hydrogen sulfide.

DESCRIPTION OF EMBODIMENTS

Figure 1:
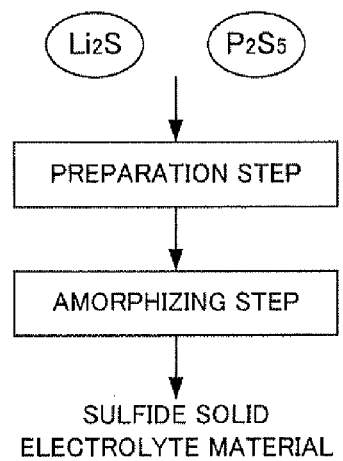
FIG. 1 is a flow chart explaining an example of a method for producing a sulfide solid electrolyte glass of the present invention.

A sulfide solid electrolyte glass, a method for producing a sulfide solid electrolyte glass and a lithium solid state battery of the present invention are hereinafter described in detail.

A. Sulfide Solid Electrolyte Glass

First, a sulfide solid electrolyte glass of the present invention is described. The sulfide solid electrolyte glass of the present invention comprises $Li_3PS_4$, and is characterized in that $Li_4P_2S_7$ is not detected by $^{31}P$ NMR measurement and the content of $Li_2S$ as determined by XPS measurement is 3% by mol or less.

According to the present invention, the sulfide solid electrolyte glass with less residue of $Li_2S$ may be obtained for the reason that the content of $Li_2S$ by XPS (X-ray photoelectron spectroscopy) measurement is 3% by mol or less. Further, the sulfide solid electrolyte glass with $S_3P—S—PS_3$ unit ($P_2S_7$ unit) not formed may be obtained for the reason that $Li_4P_2S_7$ is not detected by $^{31}P$ NMR (nuclear magnetic resonance) measurement. Thus, the sulfide solid electrolyte glass producing a tiny amount of hydrogen sulfide and having high safety may be obtained.

Cross-linking sulfur existing in $Li_2S$ and $S_3P—S—PS_3$ unit is so high in reactivity as to react with water to generate hydrogen sulfide. On the contrary, the sulfide solid electrolyte glass of the present invention has the above-mentioned composition, so that the content of $Li_2S$ and cross-linking sulfur with more hydrogen sulfide generation amount in the sulfide solid electrolyte glass may be reduced and hydrogen sulfide generation amount may be extremely decreased.

The sulfide solid electrolyte glass of the present invention comprises $Li_3PS_4$. Here, "comprise (comprising) $Li_3PS_4$" signifies that the sulfide solid electrolyte glass has a peak within a range of 415 $cm^{-1}$ to 420 $cm^{-1}$ in Raman spectroscopy measurement as well as a peak within a range of 80 ppm to 90 ppm in $^{31}P$ NMR measurement. An MAS (Magic Angle Spinning) method is preferably used in $^{31}P$ NMR measurement. With regard to the sulfide solid electrolyte glass of the present invention, hydrogen sulfide generation amount may be decreased by reason of comprising $Li_3PS_4$ ortho-composition, and hydrogen sulfide generation amount may be extremely decreased by reason of having a composition such that $Li_4P_2S_7$ is not detected by $^{31}P$ NMR measurement and the content of $Li_2S$ as determined by XPS measurement is 3% by mol or less.

The sulfide solid electrolyte glass of the present invention is characterized in that $Li_4P_2S_7$ is not detected by $^{31}P$ NMR measurement. Here, it may be confirmed by the following method that $Li_4P_2S_7$ is not detected by $^{31}P$ NMR measurement. For example, it may be confirmed by not having a peak of $P_2S_7^{4-}$ ($\delta$=90.6 ppm) in a $^{31}$P NMR spectrum obtained on the measurement conditions of the number of revolutions of 6000 Hz, a magnetic field intensity of 7.05 T and a resonance frequency of 121.5 MHz with the use of INOVA300™ manufactured by Varian.

Further, the sulfide solid electrolyte glass of the present invention is characterized in that the content of $Li_2S$ as determined by XPS measurement is 3% by mol or less. As shown in the after-mentioned examples, in the case where the above-mentioned content of $Li_2S$ is 3% by mol or less, the content of $Li_2S$ is remarkably decreased. On the other hand, in a sulfide solid electrolyte glass having ortho-composition $Li_2S·25P_2S_5$) in which $Li_2S$ does not remain theoretically, the content of $Li_2S$ is 5% by mol or more. The reason therefor is conceived to be that completely homogeneous preparation is difficult in obtaining the sulfide solid electrolyte glass from a raw material composition. For example, the content of $Li_2S$ may be determined in the following manner by XPS measurement performed on the measurement conditions of measuring in etching by 30 nm in terms of $SiO_2$ at an excited X-ray of monochromatic $AlK\alpha_{1,2}$ line (1486.6 eV), an X-ray diameter of 100 μm, a photoelectron escape angle of 45° and Ar ion etching (the etching conditions of an ion accelerating voltage of 2 kV and an etching rate of 4 nm/min (in terms of $SiO_2$)) with the use of Quantera SXM™ manufactured by Physical Electronics, Inc. (PHI). That is to say, fitting is performed while assuming three kinds of sulfur states. The area ratio between $S_{2P1/2}$ and $S_{2P3/2}$ of each sulfur is fixed to $S_{2P1/2}$:$S_{2P3/2}$=1:2, and the shift interval between $S_{2P1/2}$ and $S_{2P3/2}$ is determined at 1.3 eV. The peak position of three sulfur states is made variable to perform peak fit by selecting the peak position in which the fit becomes the best. On that occasion, the sulfur state of having a peak at the lowest energy is determined at $Li_2S$, and the S fraction of $Li_2S$ (the content of $Li_2S$) may be determined by the area ratio of each state. The three sulfur states are presumed to be S—P, Li—S—P and $Li_2S(S^{2-})$ from the higher energy side. The above-mentioned content of $Li_2S$ may be 3% by mol or less and is preferably 1% by mol or less above all. The reason therefor is to allow the sulfide solid electrolyte glass with far less hydrogen sulfide generation amount. In particular, the case where the content of $Li_2S$ is 1% by mol or less is a state such that $Li_2S$ scarcely remains while being close to the measuring limit.

The sulfide solid electrolyte glass of the present invention may be obtained by performing amorphization treatment for the after-mentioned raw material composition, for example. Examples of amorphization treatment include mechanical milling and melt extraction, and mechanical milling is preferable among them. The reason therefor is that treatment at normal temperature may be performed to intend the simplification of production processes.

A raw material composition used for the present invention contains at least Li, P, and S elements. The composition of the raw material composition is not particularly limited, provided that the composition is a composition such as to allow a sulfide solid electrolyte glass comprising $Li_3PS_4$, in which $Li_4P_2S_7$ is not detected by $^{31}$P NMR measurement and the content of $Li_2S$ as determined by XPS measurement is 3% by mol or less, but examples thereof include a composition containing $Li_2S$ and $P_2S_5$. In this case, the raw material composition may contain only $Li_2S$ and $P_2S_5$, or may contain other raw materials in addition to these. Further, $Li_2S$ contained in the raw material composition preferably has fewer impurities. The reason therefor is to allow a side reaction to be restrained. Examples of a synthesis method of $Li_2S$ include a method described in JP H07-330312 A. In addition, $Li_2S$ is preferably purified by using a method described in WO2005/040039. Similarly, $P_2S_5$ contained in the raw material composition preferably has fewer impurities.

The ratio of $Li_2S$ and $P_2S_5$ in the raw material composition is not particularly limited, provided that the ratio is a ratio such as to allow a sulfide solid electrolyte glass comprising $Li_3PS_4$, in which $Li_4P_2S_7$ is not detected by $^{31}$P NMR measurement and the content of $Li_2S$ as determined by XPS measurement is 3% by mol or less. In the present invention, the lower limit of the ratio of $Li_2S$ to the total of $Li_2S$ and $P_2S_5$ in the raw material composition may be determined from the composition with the least $Li_2S$ in the composition of the sulfide solid electrolyte glass in which $Li_4P_2S_7$ is not detected by $^{31}$P NMR measurement. On the other hand, the upper limit of the ratio of $Li_2S$ to the total of $Li_2S$ and $P_2S_5$ in the raw material composition may be determined from the composition with the most $Li_2S$ in the composition of the sulfide solid electrolyte glass in which the content of $Li_2S$ as determined by XPS measurement is 3% by mol or less. The content of $Li_2S$ is determined by the above-mentioned XPS measurement.

The ratio of $Li_2S$ and $P_2S_5$ in the raw material composition fluctuates with synthesis conditions and is preferably within a range of $Li_2S:P_2S_5$=70:30 to 75:25, more preferably within a range of $Li_2S:P_2S_5$=73:27 to 74:26, and still more preferably within a range of $Li_2S:P_2S_5$=73.5:26.5 to 74:26 on a molar basis. The reason therefor is to allow the sulfide solid electrolyte glass with far less hydrogen sulfide generation amount. Too large ratio of $Li_2S$ to $Li_2S$ and $P_2S_5$ is not preferable for the reason that hydrogen sulfide generation amount derived from remaining $Li_2S$ is increased too much. On the other hand, too small ratio of $Li_2S$ to $Li_2S$ and $P_2S_5$ is not preferable for the reason that hydrogen sulfide generation amount derived from formed $S_3P$—S—$PS_3$ unit (cross-linking sulfur) is increased too much.

Further, examples of other raw materials added to the raw material composition include lithium ortho-oxosalt of at least one selected from the group consisting of $Li_3PO_4$, $Li_4SiO_4$, $Li_4GeO_4$, $Li_3BO_3$ and $Li_3AlO_3$. The addition of lithium ortho-oxosalt allows a more stable sulfide solid electrolyte glass.

Further, a crystallized sulfide solid electrolyte glass may be obtained by performing heat treatment for the sulfide solid electrolyte glass of the present invention, for example. That is to say, a crystallized sulfide solid electrolyte glass may be obtained by sequentially performing amorphization treatment and heat treatment for the raw material composition. The temperature for heat treatment is, for example, preferably 270° C. or more, more preferably 280° C. or more, and still more preferably 285° C. or more. On the other hand, the temperature for heat treatment is, for example, preferably 310° C. or less, more preferably 300° C. or less, and still more preferably 295° C. or less. Further, the time for heat treatment is, for example, preferably within a range of 1 minute to 2 hours, and more preferably within a range of 30 minutes to 1 hour.

With regard to the sulfide solid electrolyte glass of the present invention, hydrogen sulfide concentration in five minutes after the start of measurement in a predetermined hydrogen sulfide amount measurement test is preferably 10 ppm or less, more preferably 5 ppm or less, and still more preferably 1 ppm or less. The reason therefor is that low hydrogen sulfide concentration, namely, less hydrogen sulfide generation amount allows the sulfide solid electrolyte glass with higher safety. Here, the hydrogen sulfide amount measurement test signifies the following test. That is to say, the sulfide solid electrolyte glass is weighed by 100 mg under an Ar atmosphere and is made to stand still in a hermetically sealed vessel (a capacity of 1750 cc, a humidified state of a humidity of 50% and a temperature of 20° C.), and the generation amount of hydrogen sulfide generated in the initial five minutes is measured by using a hydrogen sulfide sensor. The inside of the hermetically sealed vessel is stirred with a fan.

The sulfide solid electrolyte glass of the present invention is preferably high in value of Li ion conductance. The Li ion conductance at room temperature is, for example, preferably $10^{-5}$ S/cm or more, and more preferably $10^{-4}$ S/cm or more. Further, the sulfide solid electrolyte glass of the present invention is ordinarily powdery and an average particle diameter thereof is, for example, within a range of 0.1 μm to 50 μm.

Examples of the use of the sulfide solid electrolyte glass of the present invention include the use of a lithium battery, preferably the use of a lithium solid state battery above all. The reason therefor is to be useful as a solid electrolyte material composing a solid electrolyte layer of a lithium solid state battery. The above-mentioned lithium battery may be a primary battery or a secondary battery, and preferably a secondary battery among them. The reason therefor is to be repeatedly charged and discharged and be useful as a car-mounted battery, for example.

B. Method for Producing Sulfide Solid Electrolyte Glass

Next, a method for producing a sulfide solid electrolyte glass of the present invention is described. The method for producing a sulfide solid electrolyte glass of the present invention may be roughly divided into two embodiments. The method for producing a sulfide solid electrolyte glass of the present invention is hereinafter described while divided into a first embodiment and a second embodiment.

1. First Embodiment

First, the first embodiment of the method for producing a sulfide solid electrolyte glass of the present invention is described. The method for producing a sulfide solid electrolyte glass of the first embodiment comprises steps of: a preparation step of preparing a raw material composition containing $Li_2S$ and $P_2S_5$, and an amorphizing step of amorphizing the above-mentioned raw material composition by amorphization treatment, characterized in that the above-mentioned raw material composition contains the above-mentioned $Li_2S$ and the above-mentioned $P_2S_5$ at a ratio so as to allow the sulfide solid electrolyte glass such that $Li_4P_2S_7$ is not detected by $^{31}P$ NMR measurement and the content of $Li_2S$ as determined by XPS measurement is 3% by mol or less.

According to the first embodiment, the sulfide solid electrolyte glass with less residue of $Li_2S$ and $S_3P—S—PS_3$ unit ($P_2S_7$ unit) not formed may be obtained for the reason that the raw material composition contains $Li_2S$ and $P_2S_5$ at a predetermined ratio. Thus, the sulfide solid electrolyte glass producing a tiny amount of hydrogen sulfide and having high safety may be obtained.

FIG. 1 is a flowchart explaining an example of the method for producing a sulfide solid electrolyte glass of the first embodiment. In FIG. 1, $Li_2S$ and $P_2S_5$ are first prepared as a starting material and mixed at a ratio of 73.5:26.5 to prepare a raw material composition (preparation step). The ratio of $Li_2S$ and $P_2S_5$ is a ratio such as to allow the sulfide solid electrolyte glass in which $Li_4P_2S_7$ is not detected by $^{31}P$ NMR measurement and the content of $Li_2S$ as determined by XPS measurement is 3% by mol or less. Next, the raw material composition is amorphized by performing mechanical milling (amorphizing step). Thus, the sulfide solid electrolyte glass producing a tiny amount of hydrogen sulfide may be obtained.

The method for producing a sulfide solid electrolyte glass of the present invention is hereinafter described in each step.

(1) Preparation Step

The preparation step in the first embodiment is to prepare a raw material composition containing $Li_2S$ and $P_2S_5$ in the method for producing a sulfide solid electrolyte glass comprising $Li_3PS_4$. In addition, the raw material composition contains $Li_2S$ and $P_2S_5$ at a ratio so as to allow the sulfide solid electrolyte glass such that $Li_4P_2S_7$ is not detected by $^{31}P$ NMR measurement and the content of $Li_2S$ as determined by XPS measurement is 3% by mol or less. The raw material composition in the first embodiment is the same as the contents described in the above-mentioned "A. Sulfide solid electrolyte glass"; therefore, the description herein is omitted. Further, with regard to the raw material composition, each component is preferably dispersed uniformly.

(2) Amorphizing Step

The amorphizing step in the first embodiment is to amorphize the above-mentioned raw material composition by amorphization treatment.

The amorphization treatment in the present invention is not particularly limited, provided that the treatment is a treatment such as to allow the sulfide solid electrolyte glass, but examples thereof include mechanical milling and melt extraction, and mechanical milling is preferable among them. The reason therefor is that treatment at normal temperature may be performed to intend the simplification of production processes.

Mechanical milling is not particularly limited, provided that the mechanical milling is a method of mixing a raw material composition while allowing mechanical energy thereto; examples thereof include ball mill, vibrating mill, turbo mill, mechano-fusion and disk mill, and ball mill is preferable among them and planetary ball mill is particularly preferable. The reason therefor is to efficiently allow a desired sulfide solid electrolyte glass.

Further, various kinds of the conditions of the mechanical milling are determined so as to allow a sufficiently amorphized sulfide solid electrolyte glass. For example, in the case of using planetary ball mill, a raw material composition and a grinding ball are added and treated at predetermined number of revolutions and time. Generally, larger number of revolutions brings higher production rate of a sulfide solid electrolyte glass, and longer treating time brings higher conversion ratio of a raw material composition into a sulfide solid electrolyte glass. The number of revolutions in performing planetary ball mill is, for example, preferably within a range of 200 rpm to 500 rpm, and above all within a range of 250 rpm to 400 rpm. Further, the treating time in performing planetary ball mill is, for example, preferably within a range of 1 hour to 100 hours, and above all within a range of 1 hour to 50 hours.

(3) Heat-Treatment Step

The heat-treatment step of heating a sulfide solid electrolyte glass obtained in the amorphizing step may be performed in the first embodiment. Thus, a crystallized sulfide solid electrolyte glass is ordinarily obtained. The conditions of heat treatment are the same as the contents described in the above-mentioned "A. Sulfide solid electrolyte glass"; therefore, the description herein is omitted.

(4) Sulfide Solid Electrolyte Glass

A sulfide solid electrolyte glass obtained by the first embodiment is the same as the contents described in the above-mentioned "A. Sulfide solid electrolyte glass"; therefore, the description is omitted herein. Further, the first embodiment may provide a sulfide solid electrolyte glass characterized by being obtained by the above-mentioned preparation step and amorphizing step. Similarly, the present invention may provide a crystallized sulfide solid electrolyte glass characterized by being obtained by the above-mentioned preparation step, amorphizing step and heat-treatment step.

2. Second Embodiment

Next, the second embodiment of the method for producing a sulfide solid electrolyte glass of the present invention is described. The method for producing a sulfide solid electrolyte glass of the second embodiment is a method for producing a sulfide solid electrolyte glass comprising $Li_3PS_4$, comprising a preparation step of preparing a raw material composition containing $Li_2S$ and $P_2S_5$ at a molar ratio of $xLi_2S \cdot (100-x)P_2S_5$ (x satisfies $73<x<75$), and an amorphizing step of amorphizing the above-mentioned raw material composition by amorphization treatment.

According to the second embodiment, the sulfide solid electrolyte glass with less residue of $Li_2S$ and $S_3P-S-PS_3$ unit ($P_2S_7$ unit) not formed may be obtained by using the raw material composition containing $Li_2S$ and $P_2S_5$ at a predetermined ratio. Thus, the sulfide solid electrolyte glass producing a tiny amount of hydrogen sulfide and having high safety may be obtained.

The preparation step in the second embodiment is to prepare a raw material composition containing $Li_2S$ and $P_2S_5$ at a molar ratio of $xLi_2S \cdot (100-x)P_2S_5$ (x satisfies $73<x<75$). The above-mentioned x may be $73<x<75$, above all preferably $73.5 \leq x \leq 74$, and more preferably $73.5 \leq x \leq 73.8$. The reason therefor is to allow the sulfide solid electrolyte glass with far less hydrogen sulfide generation amount. Other items with regard to the raw material composition in the second embodiment are the same as the contents described in the above-mentioned "A. Sulfide solid electrolyte glass"; therefore, the description is omitted herein. Further, with regard to the raw material composition, each component is preferably dispersed uniformly.

The items except for the above-mentioned preparation step are the same as the contents described in the above-mentioned "1. First Embodiment"; therefore, the description is omitted herein.

C. Lithium Solid State Battery

Next, a lithium solid state battery of the present invention is described. The lithium solid state battery of the present invention comprises a cathode active material layer containing a cathode active material, an anode active material layer containing an anode active material, and a solid electrolyte layer formed between the above-mentioned cathode active material layer and the above-mentioned anode active material layer, characterized in that at least one of the above-mentioned cathode active material layer, the above-mentioned anode active material layer and the above-mentioned solid electrolyte layer contains the above-mentioned sulfide solid electrolyte glass.

According to the present invention, the use of the above-mentioned sulfide solid electrolyte glass allows a lithium solid state battery producing a tiny amount of hydrogen sulfide and having high safety.

Figure 2:
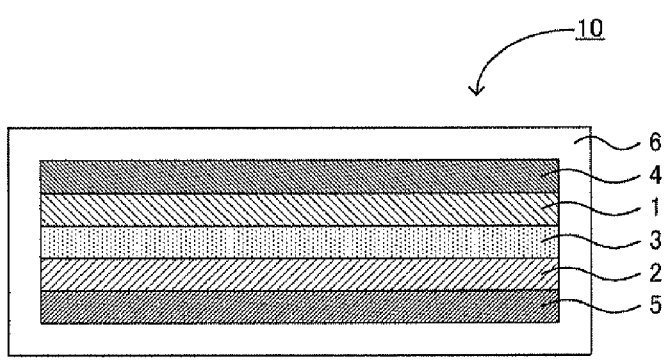
FIG. 2 is a schematic cross-sectional view showing an example of a lithium solid state battery of the present invention.

FIG. 2 is a schematic cross-sectional view showing an example of the lithium solid state battery of the present invention. A lithium solid state battery 10 shown in FIG. 2 comprises a cathode active material layer 1 containing a cathode active material, an anode active material layer 2 containing an anode active material, a solid electrolyte layer 3 formed between the cathode active material layer 1 and the anode active material layer 2, a cathode current collector 4 for performing current collecting of the cathode active material layer 1, an anode current collector 5 for performing current collecting of the anode active material layer 2, and a battery case 6 for storing these members. In the present invention, at least one of the cathode active material layer 1, the anode active material layer 2 and the solid electrolyte layer 3 is greatly characterized by containing the sulfide solid electrolyte glass described in the above-mentioned "A. Sulfide solid electrolyte glass".

The lithium solid state battery of the present invention is hereinafter described in each constitution.

1. Solid Electrolyte Layer

First, a solid electrolyte layer in the present invention is described. The solid electrolyte layer in the present invention is a layer formed between the cathode active material layer and the anode active material layer, and a layer including a solid electrolyte material. The solid electrolyte material contained in the solid electrolyte layer is not particularly limited, provided that the solid electrolyte material has Li ion conductivity.

In the present invention, the solid electrolyte material contained in the solid electrolyte layer is preferably the sulfide solid electrolyte glass described in the above-mentioned "A. Sulfide solid electrolyte glass". The reason therefor is to allow a lithium solid state battery producing a tiny amount of hydrogen sulfide and having high safety. The content of the solid electrolyte material in the solid electrolyte layer is not particularly limited, provided that the content is a ratio such as to allow desired insulating properties, but is preferably, for example, within a range of 10% by volume to 100% by volume, and above all, within a range of 50% by volume to 100% by volume. In particular, in the present invention, the solid electrolyte layer is preferably composed of only the above-mentioned sulfide solid electrolyte glass. The reason therefor is to allow a lithium solid state battery with far less hydrogen sulfide generation amount and higher safety.

Further, the solid electrolyte layer may contain a binder. The reason therefor is to allow the solid electrolyte layer having flexibility by containing a binder. Examples of the binder include a fluorine-containing binder such as PTFE.

The thickness of the solid electrolyte layer is preferably within a range of 0.1 μm to 1000 μm, for example, and within a range of 0.1 μm to 300 μm, above all. Further, examples of a method of forming the solid electrolyte layer include a method of compression-molding a material for composing the solid electrolyte layer.

2. Cathode Active Material Layer

Next, a cathode active material layer in the present invention is described. The cathode active material layer in the present invention is a layer containing at least a cathode active material, and may further contain at least one of a solid electrolyte material, a conductive material and a binder, as required.

In the present invention, the solid electrolyte material contained in the cathode active material layer is preferably the sulfide solid electrolyte glass described in the above-mentioned "A. Sulfide solid electrolyte glass". The reason therefor is to allow a lithium solid state battery producing a tiny amount of hydrogen sulfide and having high safety. The content of the solid electrolyte material in the cathode active material layer is preferably, for example, within a range of 0.1% by volume to 80% by volume, above all, within a range of 1% by volume to 60% by volume, and particularly, within a' range of 10% by volume to 50% by volume.

The cathode active material is not particularly limited but examples thereof include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. Examples of the conductive material include acetylene black, Ketjen Black and carbon fiber. Examples of the binder include a fluorine-containing binder such as PTFE.

The thickness of the cathode active material layer is preferably within a range of 0.1 μm to 1000 μm, for example. Further, examples of a method of forming the cathode active material layer include a method of compression-molding a material for composing the cathode active material layer.

3. Anode Active Material Layer

Next, an anode active material layer in the present invention is described. The anode active material layer in the present invention is a layer containing at least an anode active material, and may further contain at least one of a solid electrolyte material, a conductive material and a binder, as required.

In the present invention, the solid electrolyte material contained in the anode active material layer is preferably the sulfide solid electrolyte glass described in the above-mentioned "A. Sulfide solid electrolyte glass". The reason therefor is to allow a lithium solid state battery producing a tiny amount of hydrogen sulfide and having high safety. The content of the solid electrolyte material in the anode active material layer is preferably, for example, within a range of 0.1% by volume to 80% by volume, above all, within a range of 1% by volume to 60% by volume, and particularly, within a range of 10% by volume to 50% by volume.

Examples of the anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon. A conductive material and a binder used for the anode active material layer are the same as the case of the above-mentioned cathode active material layer.

The thickness of the anode active material layer is preferably within a range of 0.1 μm to 1000 μm, for example. Further, examples of a method of forming the anode active material layer include a method of compression-molding a material for composing the anode active material layer.

4. Other Constitutions

A lithium solid state battery of the present invention comprises at least the above-mentioned cathode active material layer, anode active material layer and solid electrolyte layer, ordinarily further comprising a cathode current collector for performing a current collecting of the cathode active material layer and an anode current collector for performing a current collecting of the anode active material layer. Examples of a material for the cathode current collector include SUS, aluminum, nickel, iron, titanium and carbon, and preferably SUS among them. On the other hand, examples of a material for the anode current collector include SUS, copper, nickel and carbon, and preferably SUS among them. Further, the thickness and shape of the cathode current collector and the anode current collector are preferably selected properly in accordance with factors such as uses of a lithium solid state battery. Further, a battery case of a general lithium solid state battery may be used for a battery case used for the present invention. Examples of the battery case include a battery case made of SUS. Further, with regard to the lithium solid state battery of the present invention, a power generating element may be formed inside an insulating ring.

5. Lithium Solid State Battery

A lithium solid state battery of the present invention may be a primary battery or a secondary battery, preferably a secondary battery among them. The reason therefor is to be repeatedly charged and discharged and be useful as a car-mounted battery, for example. Examples of the shape of the lithium solid state battery of the present invention include a coin shape, a laminate shape, a cylindrical shape and a rectangular shape.

Further, a method for producing the lithium solid state battery of the present invention is not particularly limited, provided that the method is one such as to allow the above-mentioned lithium solid state battery, but the same method as a method for producing a general lithium solid state battery may be used. Examples of the method for producing the lithium solid state battery include a method such that a material composing a cathode active material layer, a material composing a solid electrolyte layer and a material composing an anode active material layer are sequentially pressed to thereby produce a power generating element and this power generating element is stored inside a battery case, which is crimped. Further, the present invention may provide each of a cathode active material layer, an anode active material layer and a solid electrolyte layer, characterized by containing the sulfide solid electrolyte glass described in the above-mentioned "A. Sulfide solid electrolyte glass".

The present invention is not limited to the above-mentioned embodiments. The above-mentioned embodiments are exemplification, and any is included in the technical scope of the present invention, provided that it has substantially the same constitution as the technical idea described in the claim of the present invention and offers similar operation and effect thereto.

EXAMPLES

The present invention is described more specifically while showing examples hereinafter.

Example 1

Lithium sulfide ($Li_2S$) and phosphorus pentasulfide ($P_2S_5$) were used as a starting material. These powders were weighed in a glove box under an Ar atmosphere (dew point: −70° C.) so as to become a molar ratio of $73.5Li_2S \cdot 26.5P_2S_5$, and mixed by an agate mortar to obtain a raw material composition of 1 g ($Li_2S$=0.3644 g, $P_2S_5$=0.6356 g). Next, 1 g of the obtained raw material composition was projected into a 45-ml zirconia pot, and zirconia ball (φ=10 mm, 10 pieces) was further projected thereinto to hermetically seal the pot completely (Ar atmosphere). This pot was mounted on a planetary ball milling machine (P7™ manufactured by FRITSCH JAPAN CO., LTD.) to perform mechanical milling for 40 hours at the number of rotating table revolutions of 370 rpm and then obtain a sulfide solid electrolyte glass.

Example 2

A sulfide solid electrolyte glass was obtained in the same manner as Example 1 except for adopting a molar ratio of $73.8Li_2S \cdot 26.2P_2S_5$ to obtain a raw material composition of 1 g ($Li_2S$=0.3680 g, $P_2S_5$=0.6320 g).

Example 3

A sulfide solid electrolyte glass was obtained in the same manner as Example 1 except for adopting a molar ratio of 74Li$_2$S·26P$_2$S$_5$ to obtain a raw material composition of 1 g (Li$_2$S=0.3704 g, P$_2$S$_5$=0.6296 g).

Comparative Example 1

A sulfide solid electrolyte glass was obtained in the same manner as Example 1 except for adopting a molar ratio of 75Li$_2$S·25P$_2$S$_5$ to obtain a raw material composition of 1 g (Li$_2$S=0.3827 g, P$_2$S$_5$=0.6173 g).

Comparative Example 2

A sulfide solid electrolyte glass was obtained in the same manner as Example 1 except for adopting a molar ratio of 76Li$_2$S·24P$_2$S$_5$ to obtain a raw material composition of 1 g (Li$_2$S=0.3956 g, P$_2$S$_5$=0.6044 g).

Comparative Example 3

A sulfide solid electrolyte glass was obtained in the same manner as Example 1 except for adopting a molar ratio of 73Li$_2$S·27P$_2$S$_5$ to obtain a raw material composition of 1 g (Li$_2$S=0.3585 g, P$_2$S$_5$=0.6415 g).

[Evaluation]

(XPS Measurement)

Figure 3:
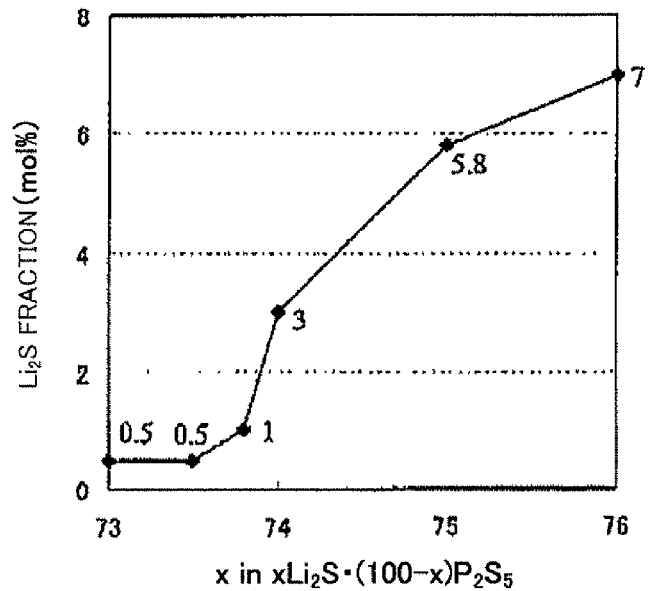
FIG. 3 is a graph showing the content of $Li_2S$ as determined by XPS measurement with respect to a sulfide solid electrolyte glass each obtained in Examples 1 to 3 and Comparative Examples 1 to 3.
Figure 4:
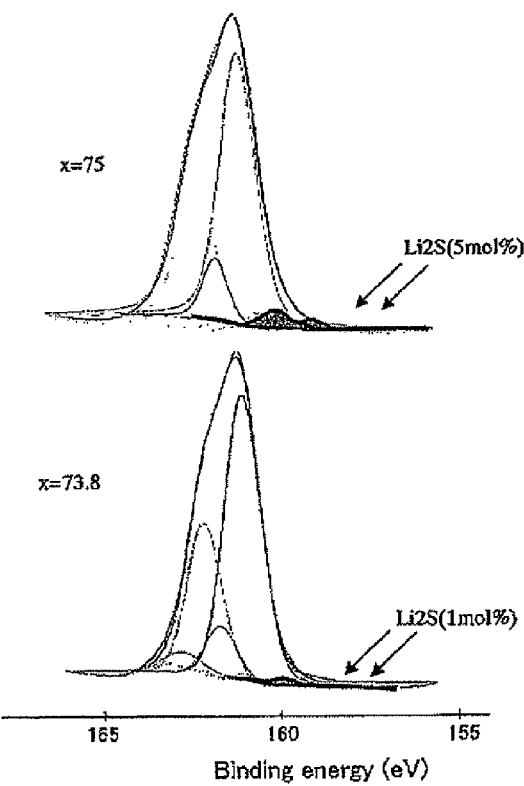
FIG. 4 is an XPS spectrum of a sulfide solid electrolyte glass obtained in Example 2 and Comparative Example 1.

XPS (X-ray photoelectron spectroscopy) measurement was performed for each of the sulfide solid electrolyte glass obtained in Examples 1 to 3 and Comparative Examples 1 to 3. The content of Li$_2$S was determined by the above-mentioned method with the use of the obtained XPS spectrum. The result is shown in FIG. 3. Further, the XPS spectrum of the sulfide solid electrolyte glass obtained in Example 2 and Comparative Example 1 is shown in FIG. 4.

As shown in FIG. 3, it was confirmed that the content of Li$_2$S (Li$_2$S fraction) was 3% by mol or less in Examples 1 to 3 and Comparative Example 3. On the other hand, it was confirmed that the content of Li$_2$S was 5% by mol or more in Comparative Examples 1 and 2. In the case where the content of Li$_2$S was 3% by mol or less, the content of Li$_2$S was remarkably decreased.

($^{31}$P NMR Measurement)

Figure 5:
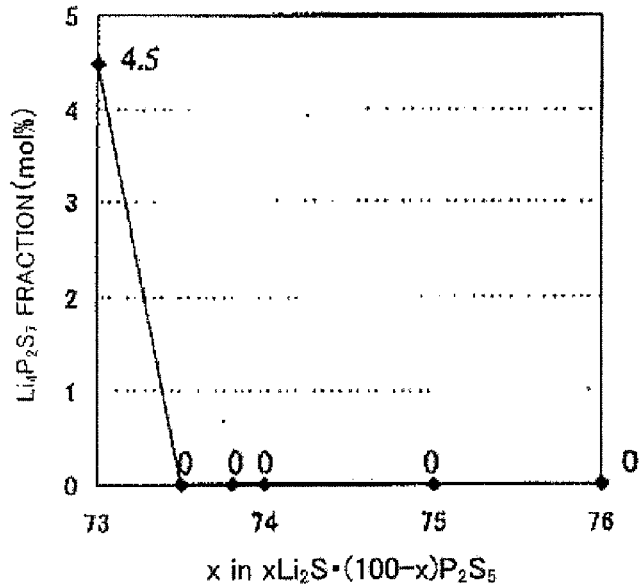
FIG. 5 is a graph showing the content of $Li_4P_2S_7$ by $^{31}P$ NMR measurement with respect to a sulfide solid electrolyte glass each obtained in Examples 1 to 3 and Comparative Examples 1 to 3.
Figure 6:
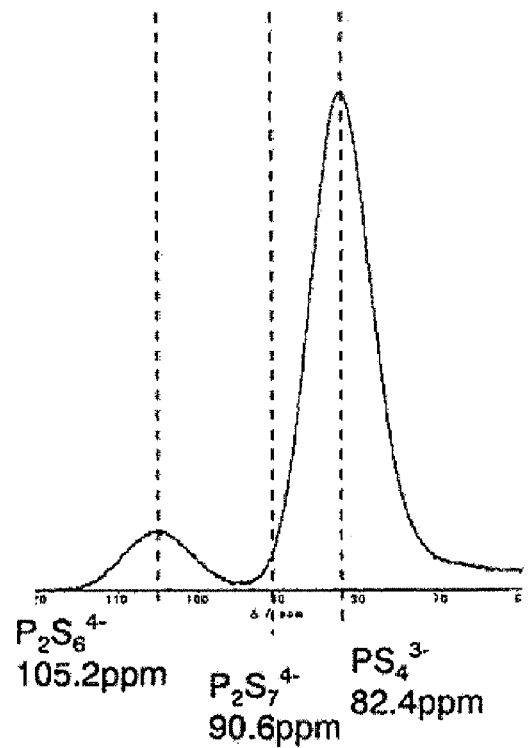
FIG. 6 is a $^{31}P$ NMR spectrum of a sulfide solid electrolyte glass obtained in Comparative Example 1.

$^{31}$P NMR (nuclear magnetic resonance) measurement was performed for each of the sulfide solid electrolyte glass obtained in Examples 1 to 3 and Comparative Examples 1 to 3. The content of Li$_4$P$_2$S$_7$ was determined by the above-mentioned method with the use of the obtained $^{31}$P NMR spectrum. The result is shown in FIG. 5. Further, the $^{31}$P NMR spectrum of the sulfide solid electrolyte glass obtained in Comparative Example 1 is shown in FIG. 6.

As shown in FIG. 5, it was confirmed that Li$_4$P$_2$S$_7$ was not detected in Examples 1 to 3 and Comparative Examples 1 and 2. On the other hand, it was confirmed that the content of Li$_4$P$_2$S$_7$ was 4% by mol or more in Comparative Example 3.

(Hydrogen Sulfide Generation Amount Measurement)

The measurement of hydrogen sulfide generation amount was performed for each of the sulfide solid electrolyte glass obtained in Examples 1 to 3 and Comparative Examples 1 to 3. The measurement of hydrogen sulfide generation amount was performed in the following manner. The sulfide solid electrolyte glass was weighed by 100 mg under an Ar atmosphere and was made to stand still in a hermetically sealed vessel (a capacity of 1750 cc, a humidified state of a humidity of 50% and a temperature of 20° C.). Air in the hermetically sealed vessel was stirred with a fan, and a hydrogen sulfide sensor was used for measurement. The hydrogen sulfide concentration of the sulfide solid electrolyte glass obtained in Examples 1 to 3 and Comparative Examples 1 to 3 in the hermetically sealed vessel five minutes after exposure to air is shown in FIG. 7.

Figure 7:
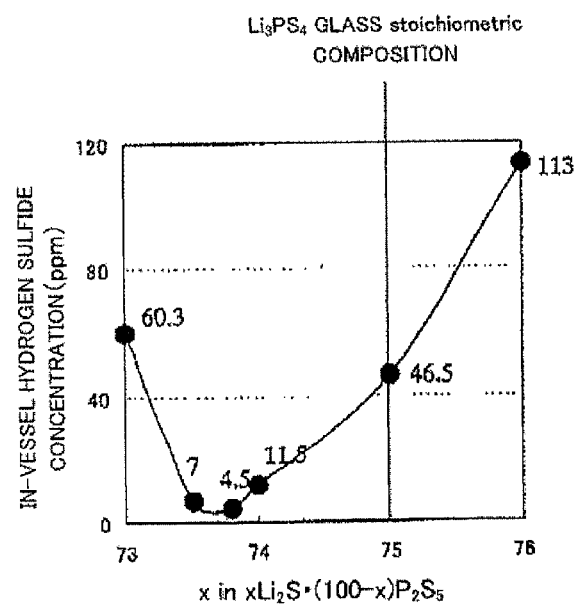
FIG. 7 is a graph showing a result of measuring hydrogen sulfide generation amount with respect to a sulfide solid electrolyte glass each obtained in Examples 1 to 3 and Comparative Examples 1 to 3.

As shown in FIG. 7, it was confirmed that Examples 1 to 3 were vastly low in hydrogen sulfide generation amount as compared with Comparative Example 1. The content of Li$_2$S and Li$_4$P$_2$S$_7$ became the minimum in Example 1 through the result of the above-mentioned XPS measurement and $^{31}$P NMR measurement, while the actual hydrogen sulfide generation amount became the minimum in Example 2 through the result of the measurement of hydrogen sulfide generation amount. The reason therefor is conceived to be that Li$_4$P$_2$S$_7$ below the lower detection limit of the $^{31}$P NMR measurement is included in Example 1.

(Li Ion Conductance Measurement)

The measurement of Li ion conductance was performed for each of the sulfide solid electrolyte glass obtained in Examples 1 to 3 and Comparative Examples 1 to 3. The measurement of Li ion conductance was performed in the following manner. 100 mg of the sulfide solid electrolyte glass added to a support tube (made of Macole) was held between electrodes manufactured by SKD. Thereafter, the sulfide solid electrolyte glass was powder-compacted at a pressure of 4.3 ton/cm$^2$ to perform impedance measurement while constraining the sulfide solid electrolyte glass at 6 Ncm. Solartron 1260™ was used for measuring, and the measurement conditions were an impressed voltage of 5 mV and a measuring frequency range of 0.01 MHz to 1 MHz. The result is shown in FIG. 8.

Figure 8:
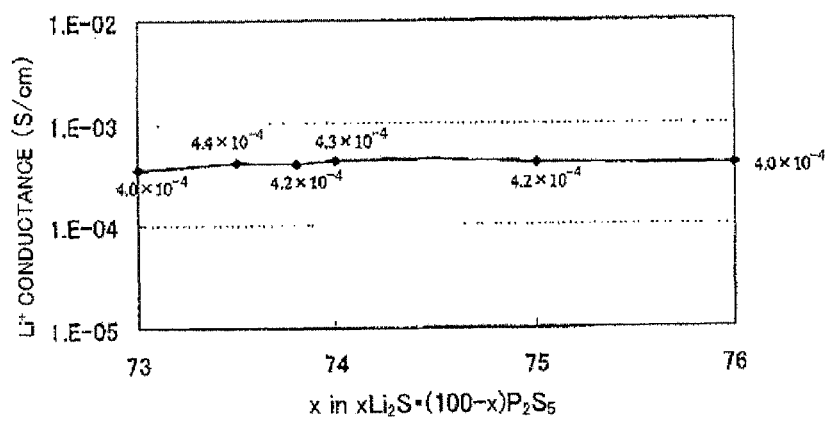
FIG. 8 is a graph showing a result of measuring Li ion conductance with respect to a sulfide solid electrolyte glass obtained in Examples 1 to 3 and Comparative Examples 1 to 3.

As shown in FIG. 8, it was confirmed that ion conductance of Examples 1 to 3 and Comparative Examples 1 to 3 was approximately the same, and Li ion conductance did not change greatly even though the composition of the sulfide solid electrolyte glass was changed.

(XRD Measurement)

XRD (X-ray diffraction) measurement was performed for the sulfide solid electrolyte glass obtained in Comparative Example 1. The result is shown in FIG. 9.

Figure 9:
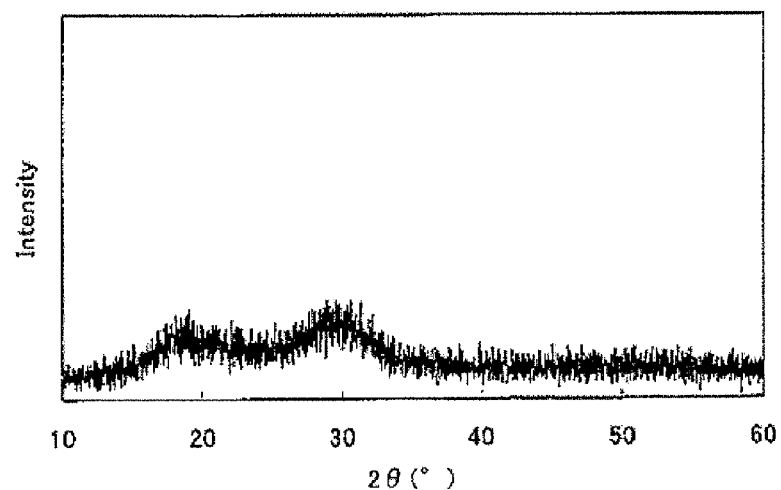
FIG. 9 is a graph showing a result of measuring XRD with respect to a sulfide solid electrolyte glass obtained in Comparative Example 1.

As shown in FIG. 9, it was confirmed that the peak of Li$_2$S (2θ=27.0°, 31.2°, 44.8°, 53.1°) was not detected in Comparative Example 1. On the contrary, the presence of Li$_2$S was confirmed in the result of the above-mentioned XPS measurement.

REFERENCE SIGNS LIST

1 . . . Cathode active material layer
2 . . . Anode active material layer
3 . . . Solid electrolyte layer
4 . . . Cathode current collector
5 . . . Anode current collector
6 . . . Battery case
10 . . . Lithium solid state battery

The invention claimed is:

1. A sulfide solid electrolyte glass comprising Li$_3$PS$_4$, wherein Li$_4$P$_2$S$_7$ is not detected by $^{31}$P NMR measurement and a content of Li$_2$S as determined by XPS measurement is 3% by mol or less.

2. The sulfide solid electrolyte glass according to claim 1, wherein the content of Li$_2$S as determined by XPS measurement is 1% by mol or less.

3. A method for producing a sulfide solid electrolyte glass comprising Li$_3$PS$_4$, comprising:

preparing a raw material composition containing Li$_2$S and P$_2$S$_5$; and amorphizing the raw material composition by an amorphization treatment, wherein the raw material composition contains $Li_2S$ and $P_2S_5$ at a ratio so that the method produces the sulfide solid electrolyte glass, in which $Li_4P_2S_7$ is not detected by $^{31}P$ NMR measurement and a content of $Li_2S$ as determined by XPS measurement is 3% by mol or less.

4. The method for producing a sulfide solid electrolyte glass according to claim 3, wherein the content of $Li_2S$ as determined by XPS measurement is 1% by mol or less.

5. The method for producing a sulfide solid electrolyte glass according to claim 3, wherein the amorphization treatment is mechanical milling.

6. A lithium solid state battery comprising a cathode active material layer containing a cathode active material, an anode active material layer containing an anode active material, and a solid electrolyte layer formed between the cathode active material layer and the anode active material layer;

wherein at least one of the cathode active material layer, the anode active material layer and the solid electrolyte layer contains the sulfide solid electrolyte glass according to claim 1.

7. The sulfide solid electrolyte glass according to claim 1, wherein the sulfide solid electrolyte glass is produced from a raw material composition containing $Li_2S$ and $P_2S_5$ at a molar ratio of $xLi_2S \cdot (100-x) P_2S_5$ where x satisfies $73 < x < 75$.

8. The sulfide solid electrolyte glass according to claim 1, wherein the sulfide solid electrolyte glass has a hydrogen sulfide concentration in the range of 10 ppm or less.

* * * * *